United States Patent
Evens et al.

(10) Patent No.: US 10,706,038 B2
(45) Date of Patent: Jul. 7, 2020

(54) SYSTEM AND METHOD FOR STATE OBJECT DATA STORE

(71) Applicant: Cisco Technology, Inc., San Jose, CA (US)

(72) Inventors: Timothy Evens, Bainbridge Island, WA (US); Serpil Bayraktar, Los Gatos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 384 days.

(21) Appl. No.: 15/661,294

(22) Filed: Jul. 27, 2017

(65) Prior Publication Data

US 2019/0034472 A1 Jan. 31, 2019

(51) Int. Cl.
*G06F 17/30* (2006.01)
*G06F 16/23* (2019.01)
*G06F 16/28* (2019.01)
*G06F 16/22* (2019.01)

(52) U.S. Cl.
CPC .......... *G06F 16/2365* (2019.01); *G06F 16/22* (2019.01); *G06F 16/28* (2019.01)

(58) Field of Classification Search
CPC ....... G06F 16/2365; G06F 16/22; G06F 16/28
See application file for complete search history.

(56) References Cited

U.S. PATENT DOCUMENTS

| | | | | |
|---|---|---|---|---|
| 8,868,493 B2 * | 10/2014 | Serlet | | G06F 16/219 707/610 |
| 9,176,951 B2 * | 11/2015 | Patrudu | | G06F 40/40 |
| 9,195,937 B2 | 11/2015 | Deninger et al. | | |
| 9,313,232 B2 * | 4/2016 | Ahuja | | G06F 21/606 |
| 9,374,225 B2 * | 6/2016 | Ahuja | | H04L 9/3247 |
| 9,430,564 B2 * | 8/2016 | Ahuja | | H04L 63/20 |
| 9,552,548 B1 * | 1/2017 | Brestoff | | G06N 20/00 |
| 9,794,254 B2 * | 10/2017 | Ahuja | | H04L 63/0853 |
| 10,367,786 B2 * | 7/2019 | Gaitonde | | H04L 63/0245 |
| 2010/0199257 A1 * | 8/2010 | Biggerstaff | | G06F 8/456 717/104 |
| 2010/0332401 A1 * | 12/2010 | Prahlad | | G06F 3/0649 705/80 |
| 2017/0185625 A1 | 6/2017 | Cheru et al. | | |
| 2017/0366327 A1 * | 12/2017 | Kim | | H04H 20/33 |
| 2018/0150548 A1 * | 5/2018 | Shah | | G06F 16/254 |

OTHER PUBLICATIONS

International Search Report and Written Opinion from the International Searching Authority, dated Oct. 5, 2018, 10 pages, for corresponding International Patent Application No. PCT/US2018/043432.

* cited by examiner

*Primary Examiner* — Huawen A Peng
(74) *Attorney, Agent, or Firm* — Polsinelli PC

(57) ABSTRACT

Disclosed in a fast, compact, efficient, hardware agnostic, stateful data store that can universally store and track millions of stateful data objects, such as networking routing data (or any stateful data) in files for use in, for example, embedded applications. Stateful data objects can be tracked by a modified tree for updating and insert data objects into the stateful data store. The stateful data object can also be allocated additional space in memory for potential future data updates

20 Claims, 8 Drawing Sheets

FIG. 4

DATA FILE 440

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |     Type      |     Flags     |           Key Count           |
   +-+-+-+-+-+-+-+-+-+-+-+-+-+-+-+-+-+-+-+-+-+-+-+-+-+-+-+-+-+-+-+-+
   |                          Length Used                          |
   +-+-+-+-+-+-+-+-+-+-+-+-+-+-+-+-+-+-+-+-+-+-+-+-+-+-+-+-+-+-+-+-+
   |                       Length Allocated                        |
   +-+-+-+-+-+-+-+-+-+-+-+-+-+-+-+-+-+-+-+-+-+-+-+-+-+-+-+-+-+-+-+-+
   |                        Reference Count                        |
   +-+-+-+-+-+-+-+-+-+-+-+-+-+-+-+-+-+-+-+-+-+-+-+-+-+-+-+-+-+-+-+-+
   |              Keys... first key is required (variable)         |
   +-+-+-+-+-+-+-+-+-+-+-+-+-+-+-+-+-+-+-+-+-+-+-+-+-+-+-+-+-+-+-+-+
   |                        Data (variable)                        |
   +-+-+-+-+-+-+-+-+-+-+-+-+-+-+-+-+-+-+-+-+-+-+-+-+-+-+-+-+-+-+-+-+
```

SYSTEM AND METHOD FOR STATE OBJECT DATA STORE

The present technology pertains to storing state object data, and more specifically to tracking state object data at a high rate utilizing agnostic hardware and minimal storage space.

BACKGROUND

Tracking state object data can be difficult in different environments based on the number of state objects, rate of incoming state objects, data retention periods, purging state objects, data index, and hardware limitations, to name a few. In a networked forwarding environment, (e.g., Border Gateway Protocol (BGP) Monitoring Protocol (BMP)) an entire forwarding or routing table can be conveyed whenever a connection (e.g., peer) is established or refreshed. This can equate to duplicate entries along with changed entries. An average IPv4 Internet peer has over 700,000 Network Layer Reachability Information (NRLI). The average service provider transit peering router has approximately 25-50 peers. Over 17,500,000 NLRIs are sent when a connection is established. The average service provider can have hundreds of Internet transit and peering edge routers. The number of NLRIs to maintain are well into the billions when we maintained at a per router and per peer basis.

Further, memory costs more than disk and network implementers demand that memory usage be kept low (e.g., in the 1 GB or less range) without sacrificing real-time processing of incoming NLRI updates. There are currently no disk based trees or data store implementation able to maintain (e.g., search, insert, update, delete, etc.) millions of objects at sustained rates of 50,000 or greater per second.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates an example data file mapping;

DESCRIPTION OF EXAMPLE EMBODIMENTS

Figure 1:
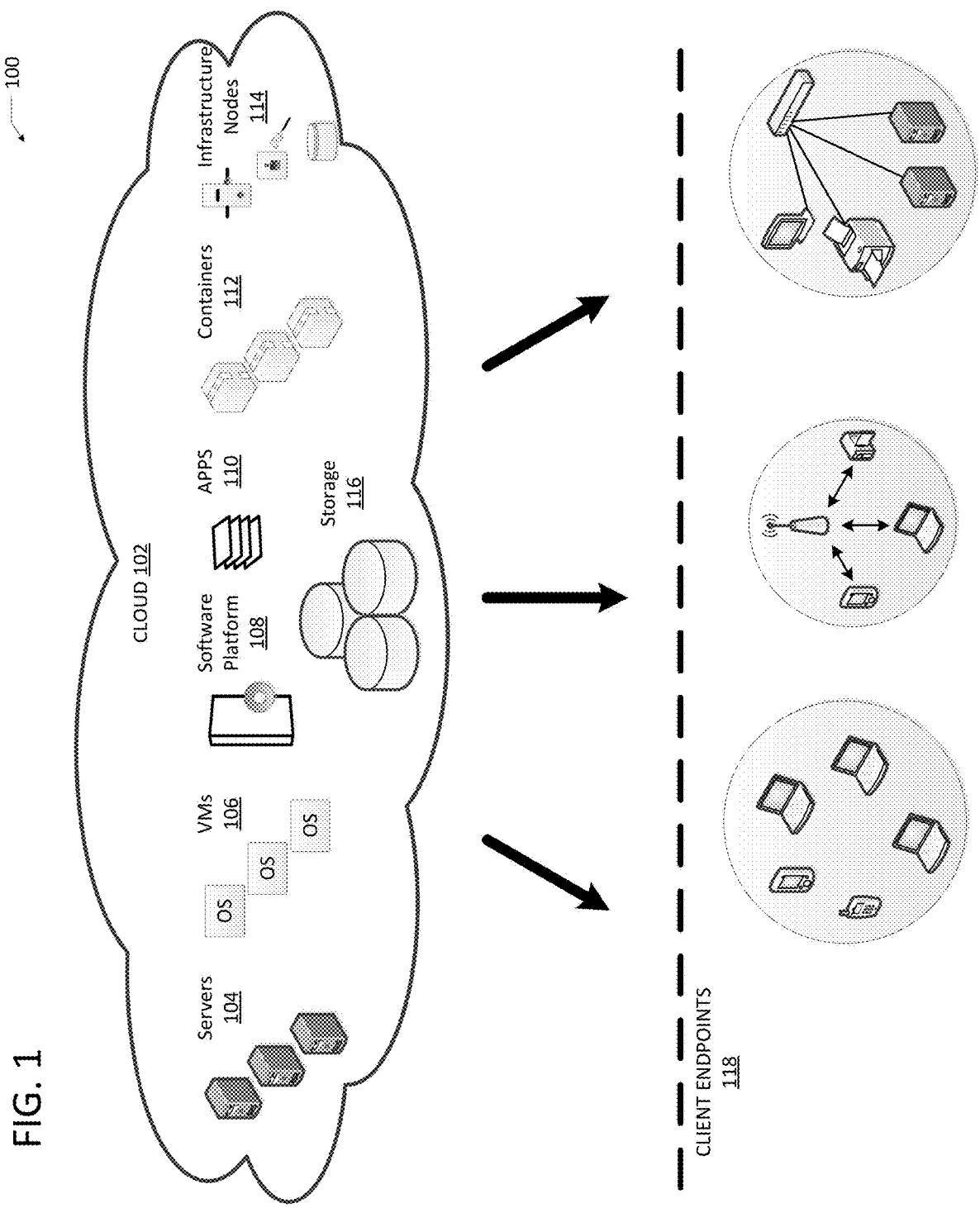
FIG. 1 illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DESCRIPTION

The disclosed technology addresses the need in the art for fast and efficient storage of large quantities of state data that are constantly updated. The present technology involves systems, methods and computer-readable media for efficiently and effectively storing and updating state objects by utilizing an index file structure, data object structure and a modified ternary tree implementation.

Figure 2:
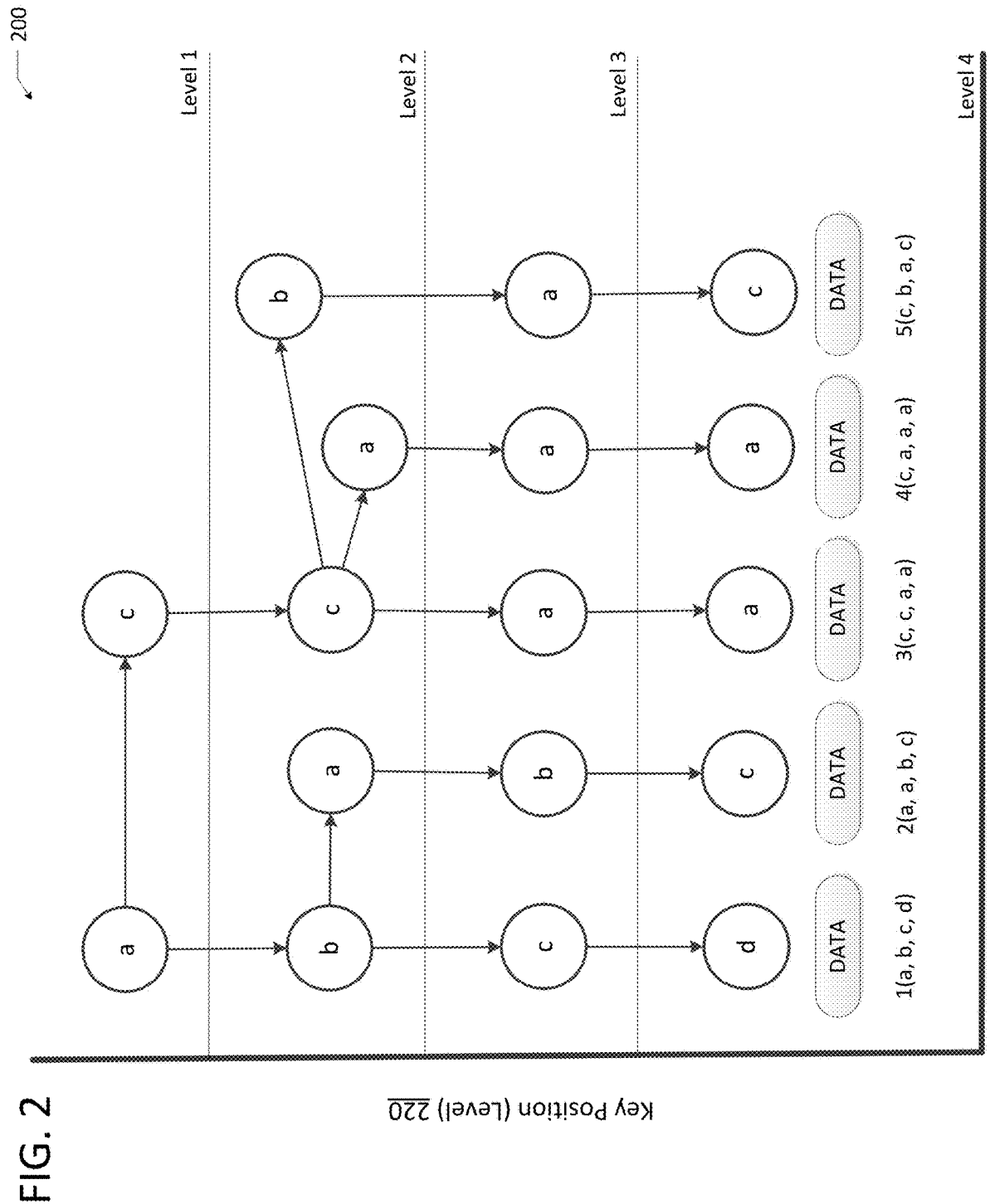
FIG. 2 illustrates an example SODS ternary tree implementation.
Figure 3:
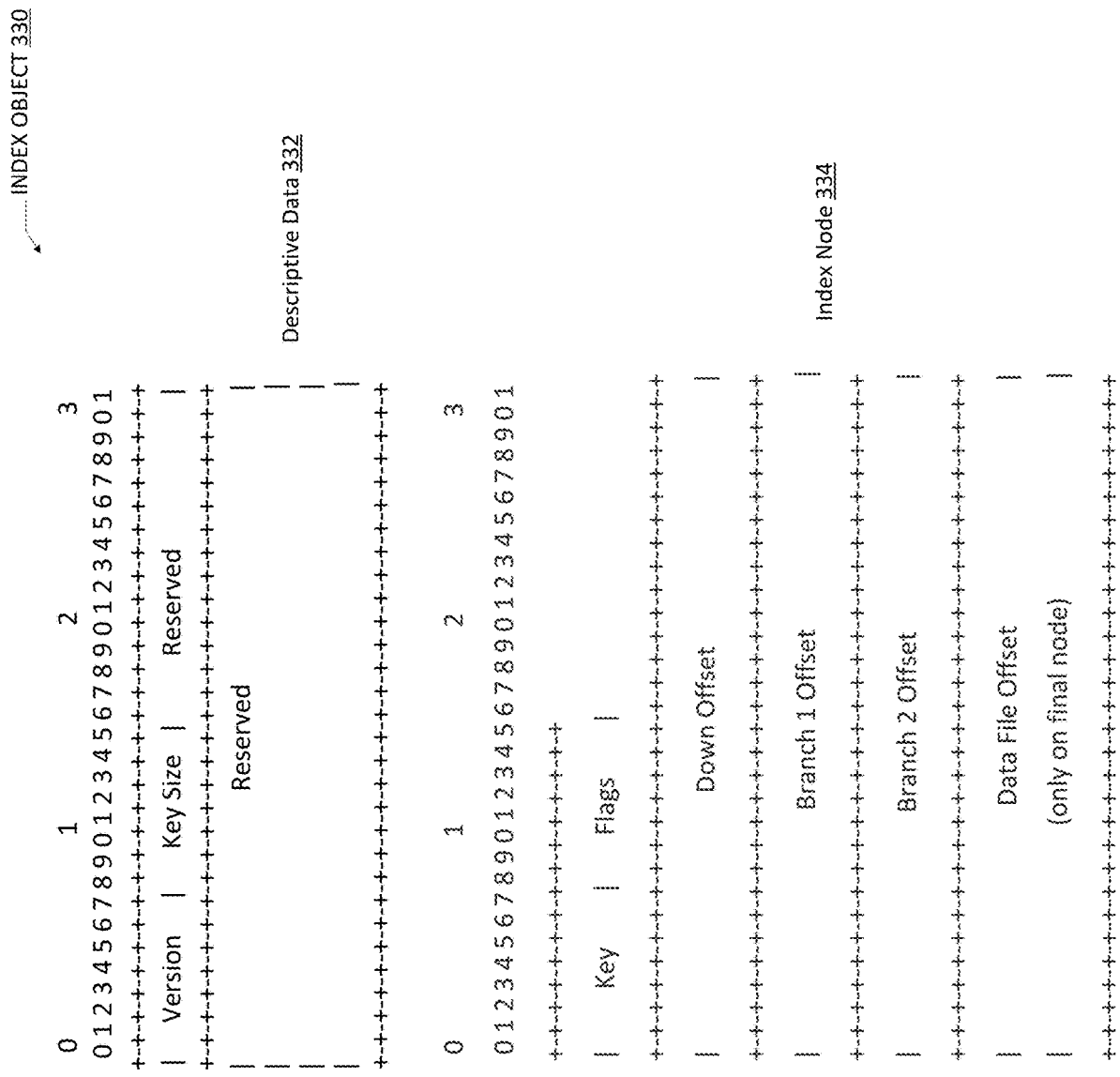
FIG. 3 illustrates an example index file mapping.
Figure 5:
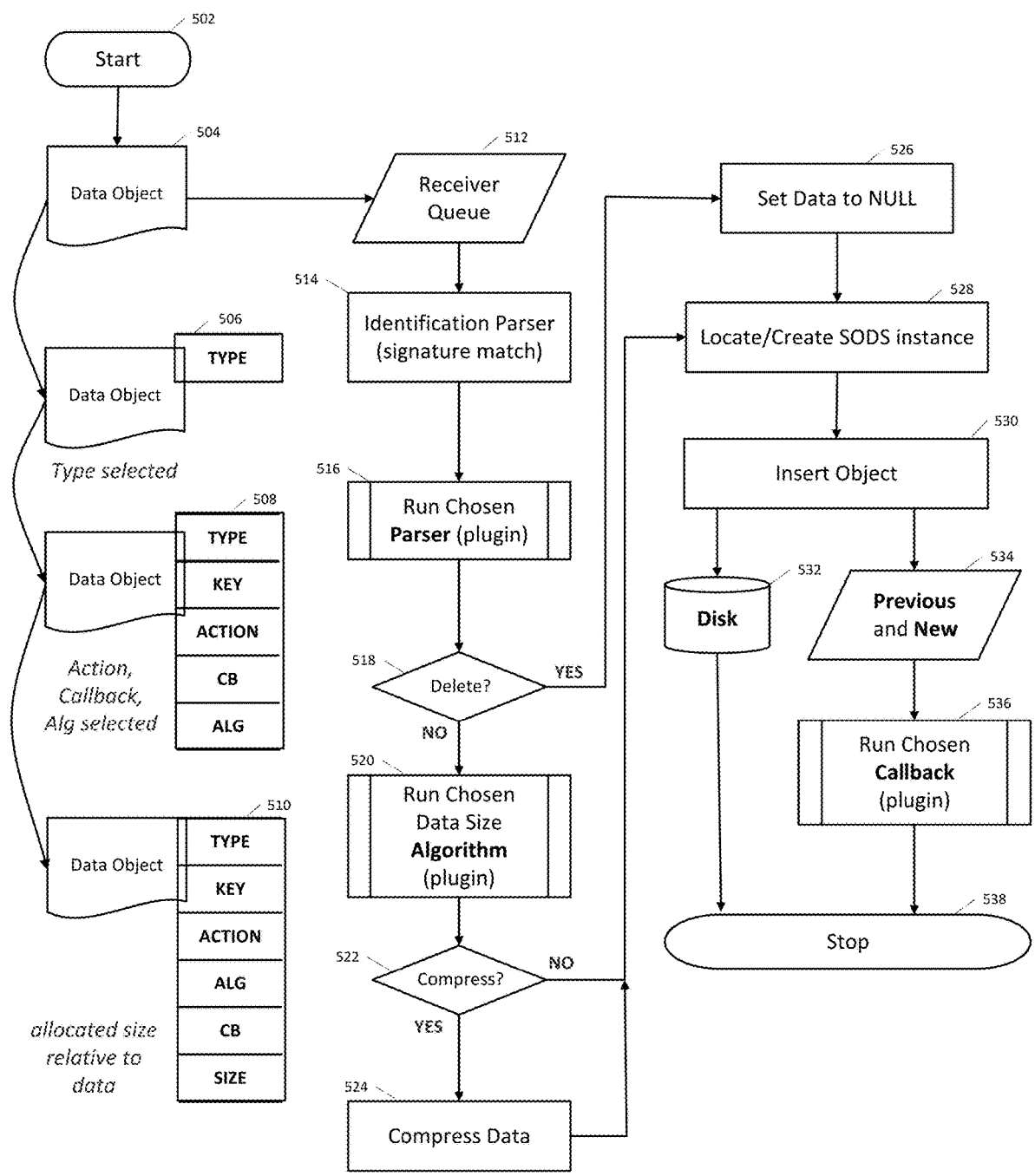
FIG. 5 illustrates a flow chart of an example SODS data object ingest.
Figure 6:
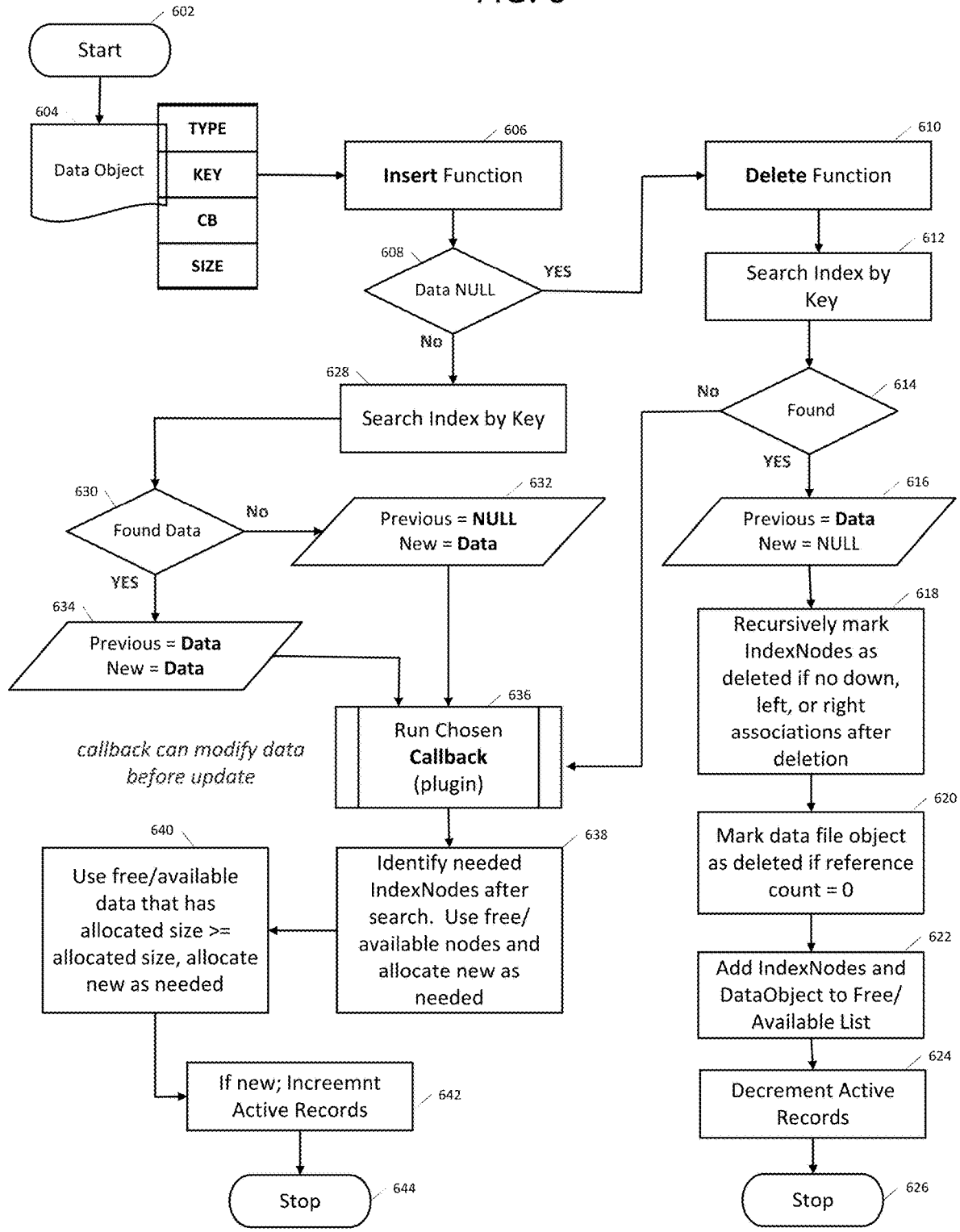
FIG. 6 illustrates a flow chart of an example SODS data object insert and callback.
Figure 7:
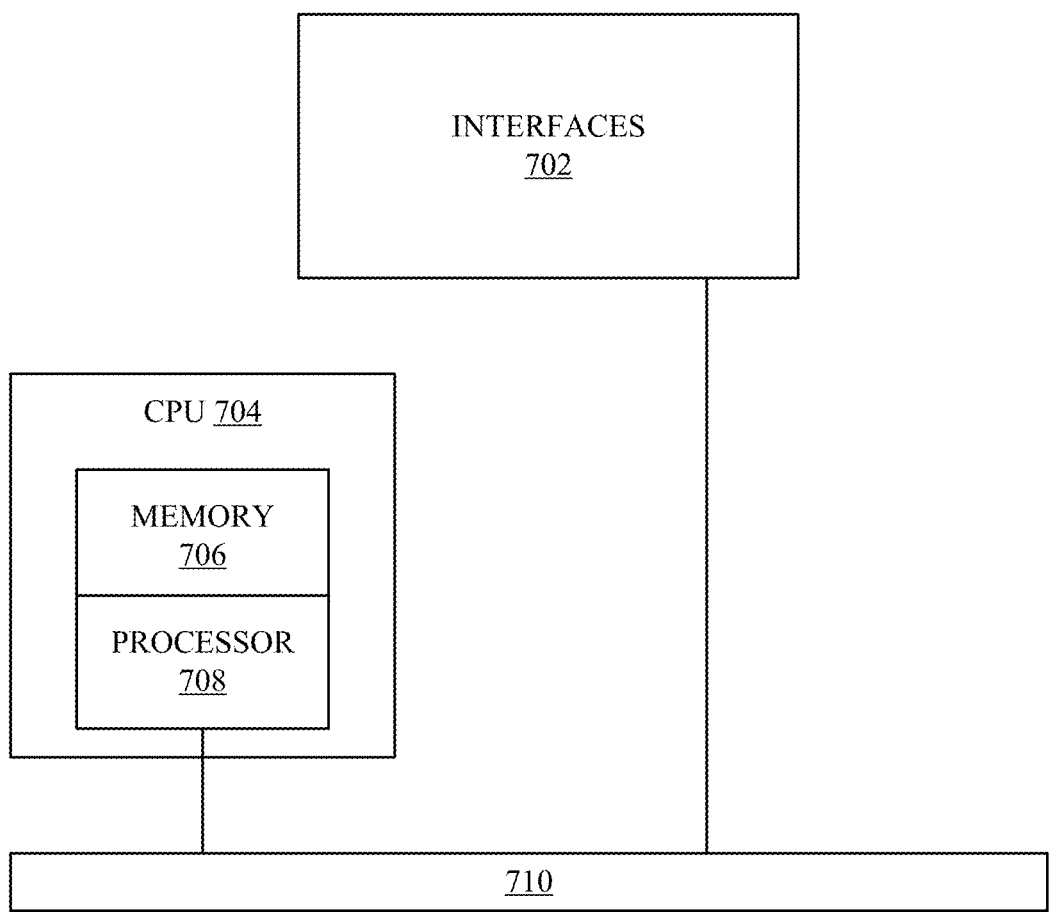
FIG. 7 illustrates an example network device in accordance with various embodiments.
Figure 8:
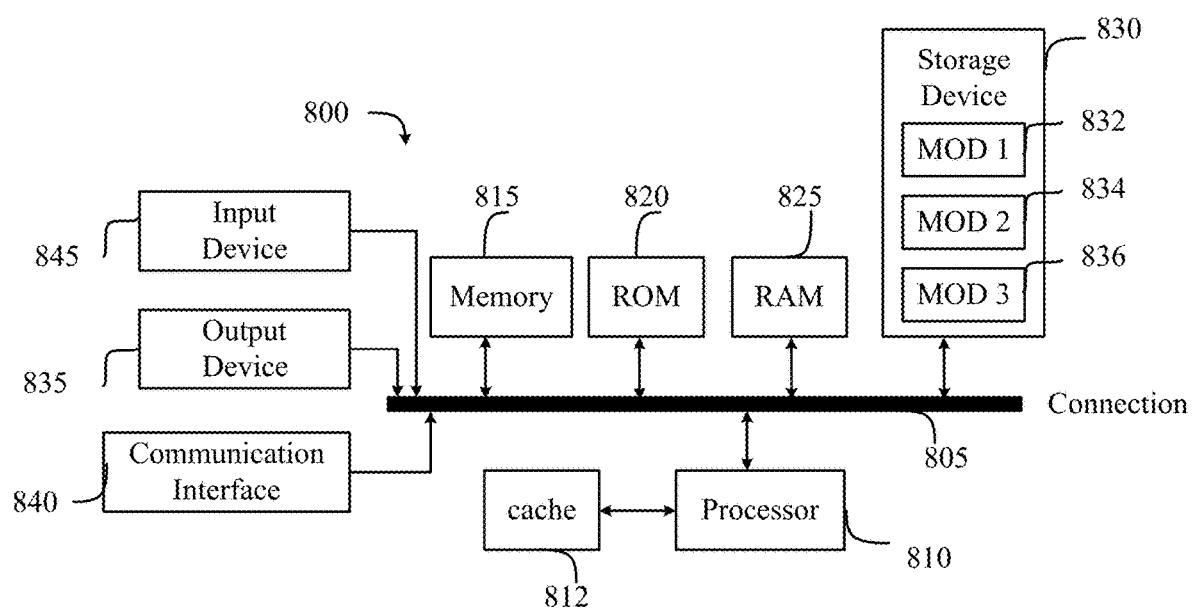
FIG. 8 illustrates an example computing device in accordance with various embodiments.

A description of network environments and architectures for state object state store, as illustrated in FIG. 1, is first disclosed herein. A discussion of mechanisms seeking data objects, as illustrated in FIG. 2, will then follow. The discussion then moves to the index file structure and data object structure, as illustrated in FIGS. 3-4. The discussion then moves to flow charts of example data object updates, as illustrated in FIGS. 5-6. The discussion then concludes with a brief description of example devices, as illustrated in FIGS. 7 and 8. These variations shall be described herein as the various embodiments are set forth. The disclosure now turns to FIG. 1.

FIG. 1 illustrates a diagram of an example Cloud Computing Architecture 100. The architecture can include Cloud 102. Cloud 102 can include one or more private clouds, public clouds, and/or hybrid clouds. Moreover, Cloud 102 can include Cloud Elements 104-116. Cloud Elements 104-116 can include, for example, Servers 104, Virtual Machines (VMs) 106, one or more Software Platforms 108, Applications or Services 110, Software Containers 112, Infrastructure Nodes 114 and Storage 116. Infrastructure Nodes 114 can include various types of nodes, such as compute nodes, storage nodes, network nodes, management systems, etc. Storage 116 can include scalable storage in Cloud 102. Storage 116 can be any disk array or storage system capable of being connected to cloud 102 and storing data.

Cloud 102 can provide various cloud computing services via the Cloud Elements 104-116, such as storage as a service (STaaS) (e.g., hosted storage, etc.), software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

Client Endpoints 118 can connect with Cloud 102 to obtain one or more specific services from Cloud 102. Client Endpoints 118 can communicate with Elements 104-114 via one or more public networks (e.g., Internet), private networks, and/or hybrid networks (e.g., virtual private network). Client Endpoints 118 can include any device with networking capabilities, such as a router, a switch, a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

One such Application or Service 110 can include a State Object Data Store (SODS). SODS can be configured to store billions of objects through multiple SODS instances. SODS can store and track these objects at a high rate (e.g., 100,000 objects per second). SODS can store and track objects at the same rates across different hardware capabilities (e.g., hardware agnostic). Each SODS instance can run multiple threads, where a single thread can scale to 20,000 search/insert/update/delete operations per second while running on agnostic hardware (e.g., average inexpensive disks—7200 rpm to solid state drives). For example, based on the object alignment and strategies illustrated in FIG. 2-6. In some examples, the object can be routing data (e.g., BGP prefix) and a set of attributes. In other examples, the object can be IoT data (e.g., state data) and metadata. For example, an IoT refrigerator can have a state of operational (e.g., running within predetermined conditions) and metadata of temperature, energy usage, compressor status, etc.

In a general sense, the object data is a current state and does not include historical data. For example, every time a new state comes in the current state can be replaced or updated (e.g., the data object is updated based on the previous object, such as updating a counter based on the previous value to the new value). In some examples, the object including the current state is retrieved and one or more operations can be performed with the current state and new state (e.g., received data). For example, a difference (e.g., diff) can be determined between the current state and the new state, with the difference being stored in place of the current state. In other non-limiting examples, the operation can be an absolute diff, subtraction, a replacement, delta, delete, non-operation (previous and new data the same) etc.

A seek or look-up of the object data can performed based on an index file, which is illustrated below in FIG. 3. In some examples, the index files can be kept small (e.g., less than 500 MB) for faster look-up times. In some examples, the index files include only the index and do not store any data (e.g., even with larger key sizes). The look-ups can utilize a search tree (e.g., ternary search tree, etc.), an example shown in FIG. 2.

FIG. 2 illustrates an example SODS tree implementation 200. SODS tree implementation 200 shows an example key size of 4 bytes, however the key size can be between 1 byte and 255 bytes. The key size can be fixed upon initiation of the data store (e.g., Storage 116). SODS tree implementation 200 illustrates paths through a tree utilizing different keys 222 based on key positions 220 (e.g., levels). For example key 1 is equal to 'abcd'. The path to the stored data 223 utilizing key 1 starts at level 1 is 'a'; level 2 is 'b'; level 3 is 'c'; and level 4 is 'd'.

The SODS tree implementation can be favored toward 'in-place updates and deletions' over 'compression and balancing'. To achieve this, a ternary search tree can be modified by using two different type of nodes: an interim node and an a final node. Both node types are similar with the exception that the final node can have an extra 8 bytes to convey the data offset pointer. The data offset is an offset within the data file to read the data object. This enables direct location access (e.g., seek) to the data object within a potentially large data file.

The concept of a leaf node is not present in SODS tree implementation. A final node is not a leaf node as it can have children, but a final node will not have a down child as the final node is the last down node.

The SODS tree implementation enables simple and fast deleting keys/objects operations since re-pinning pointers to children nodes is not a requirement and the fixed size of the node enables re-use of the nodes.

Each node, in the SODS tree implementation, references other children nodes by indicating the file offset pointer, instead of memory pointer. While this is used for disk files, memory can still be used and the size of the pointer can be adjusted to a memory implementation.

In the SODS tree implementation, the index file is not expected to be greater than approximately 4 gigabytes (e.g., no data is stored in the index file). This enables 4-octet children file offset pointers. The data file is can to be larger than 4 GB, requiring the data offset pointer to be 8-octets. To save disk space, the final node is the only node that can contain the extra 8-octet data pointer (e.g., because that is where the data is stored).

Each node can have 3 offset pointers for children. For example, a down offset pointer (e.g., equal) to the next node in the key position level. A search moves to the next key by going down; a branch 1 next node (e.g., left) at the same key position level has a lower key than current node; and a branch 2 next node (e.g., right) at the same key position level that has a higher key than current node.

As shown in FIG. 2, each data object has a unique key. A key is unique over different types of objects. In some examples, a key compose of {type, key} can be used to avoid key collisions between types (e.g., data types). Unlike other keys, the keys in a SODS implementation do not need to be aligned (sorted) (e.g., because the key order is irrelevant to the search). Nodes can be appended or updated and are not relinked on insert/update like in other methods.

In environments where large quantities of data are stored and updated, the ability for the data to grow opposed to being deleted and then reclaimed can add in storage efficiencies and speed. As shown in FIG. 4, data that is associated to an object is expected to grow and shrink (e.g., length allocated v. length used).

For example, an AS_PATH might grow or shrink for a prefix. The frequent updates (and change in size) is enabled by introducing two length values for each data object. Each data object can have a 'length used' value and a 'length allocated' value. The actual disk size of the data object is based on the allocated length. For example, AS_PATH can initially be 100 bytes, the 'length used' would be 100, but since the path is expected to grow and shrink the allocation could be 300 bytes. The disk usage for the data object would include 300 bytes for data. Subsequently, the object can be updated where the object can grow up to 300 bytes (and shrink as well).

The size of the 'length allocated' can be based on the implementation of the data type (e.g., needs and/or expectations). The implementation can dynamically size the 'length allocated' based on 'length used' in order to not waste disk space. In some examples, the 'length allocated' can be determined by a growth factor (e.g., a number times the 'length used' value). For example, a growth size of 2× and 'length used' of 5 bytes would equate to a 'length allocated' of 10 bytes. It is important to determine the appropriate 'length allocated' because and over estimate can waste storage space and an under estimate objects will have to be moved to accommodate outgrowing the 'length allocated.'

FIG. 3 illustrates an example index file mapping. Index File 330 can include a Descriptive Data 332 and an Index Node 334. For example, the index file can contain one descriptive object, which can be the first entry in the file, and one or more index nodes (it will not contain a data object). The descriptive data will not contain an index node. Descriptive Data 332 can be followed by concatenated index objects. Descriptive Data 332 can be used to convey needed information regarding the configuration of the data store (for example, version and key size). In some examples the version can the scheme/encoding used. In some examples, key size defines the fixed key size value. In some examples, keys are zero padded to this size. In some examples, keys can be restricted to 255 or less octets in size to ensure that the index file does not grow to large. In some examples, Key Size can be configurable per data store instance (file pair).

Index Node 334 can include a plurality of field descriptions as illustrated in FIG. 3. The Key field can be 1-octet key of the index node (one byte of the key). The Flag field can be 1-octet used for flags, for example, Bit 7: Object is marked for deletion, Bit 6: Object is marked as a final node. The Down Offset field can include a 4-octet unsigned 32 bit integer indicating the next key level index node (e.g., descending down to the next key byte). The Branch 1 Offset field can include 4-octet unsigned 32 bit integer indicating the next index node at the same level. When, for example, the current key is less than this nodes key, move to branch 1. The Branch 2 Offset field can include 4-octet unsigned 32 bit integer indicating the next index node at the same level. When, for example, current key is greater than this nodes key, move to branch 2. The Data File Offset filed (e.g., in final node) can include 8-octet unsigned 64 bit integer that indicates the file offset in the data file where the data object starts. In some examples, offset can be ZERO, which indicates that there is no data for this object (e.g., when indexing and key value is sufficient).

FIG. 4 illustrates an example data file mapping. Data Object 440 can include a series of data objects. For example, the data object can be stored in its own file, which contains one data descriptor, first object, followed by one or more data objects. Data Object 440 can include a plurality of field descriptions as illustrated in FIG. 4.

The Type field can include 1-octet type describes the value encoding for the object. The Flag field can include 1-octet used for flags, for example, Bit 7: Object is marked for deletion. The Key Count field can include 1-octet value indicating the number of keys present. The Length Used field can include 4-octet unsigned 32 bit integer defines the actual size for the value in octets. In some examples, this value defines the value size. When, for example, this is ZERO then the object value allocation is free to be reused or deleted. The Length Allocated field can include 4-octet unsigned 32 bit integer defines the maximum value size in octets that can be used. In some examples, the next object value object starts after this size. The Reference Count field can include 4-octet reference count value indicates the number of other objects that are referencing this object. In some examples, the value is an unsigned 32 bit integer. In some examples, a value of ZERO means that no other object is referencing this object, which may be normal depending on the type of object. The Keys field can include variable length number of keys. In some examples, the total size is key count*key size. In some examples, first key is required, making the minimum value the size of the key (e.g. 16 bytes for 128 bit key). The Data field can include a data value of variable length and is the size of length allocated. In some examples, the data value should be zero padded when the length used is less than length allocated.

Since the key is stored in the data object as well as the index file, an inaccessible index file (e.g., corrupted, missing, etc.) does not mean the data object is unavailable. For example, the data can still be accessed through the key in the data object. The index file is needed to update data and maintain performance (e.g., speed), but not required to access the data. In situations where the index file is missing or needs to be rebuilt (e.g., migration, recovery, etc.) the index file can be easily rebuilt from the keys in the data object.

The method shown in FIG. 5 is provided by way of example, as there are a variety of ways to carry out the method. Additionally, while the example method is illustrated with a particular order of sequences, those of ordinary skill in the art will appreciate that FIG. 5 and the sequences shown therein can be executed in any order that accomplishes the technical advantages of the present disclosure and can include fewer or more sequences than illustrated.

Each sequence shown in FIG. 5 represents one or more processes, methods or subroutines, carried out in the example method. The sequences shown in FIG. 5 can be implemented in a network environment such as network environment 100 shown in FIG. 1. The flow chart illustrated in FIG. 5 will be described in relation to and make reference to at least the elements of system 100 shown in FIG. 1.

FIG. 5 shows a flow diagram of an example method 500 of SODS data object ingest flow. Method 500 can start at sequence 502. Data object 504 (e.g., raw data object) can be received at a cloud (e.g., cloud instance 102, storage 116, servers 104, etc.) at sequence 512. For example, the data object can be received with a request to ingest (e.g., store) the data object. For example, a cloud can receive state data and metadata from a networked refrigerator (or other networked device, including, but not limited to thermostat, television, router, switch, etc.). At sequence 514, the data object (e.g., raw data object) can be identified, for example, by using signature analysis (e.g., to identify the type of data object). For example, the type can be identified based on the data object itself, size of the data object, specific bytes of the data object, etc. In some examples, a parser can be identified based on the data object type. At this point, the type of the data object is known as shown in 506.

At sequence 516, a more details analysis of the data object can be performed by running a parser (e.g., chosen based on the type of data object identified in sequence 514). The parser can identify key, action, callback and algorithm associated with the data object as shown in data object 508. In some examples, the parser can also maps out locations of SODS instances based on key and hash map.

At sequence 518, a determination is made on whether the action associated with the data object is a delete action. For example, the action associated with the data object identified from the detailed analysis (e.g., at sequence 516). When the action is a delete action, the method can proceed to sequence 526. When the action is not a delete action, the method can proceed to sequence 520.

At sequence 520, a determination of the data size needed to store the data object is made. For example, based on the type of data object, size of data object, etc. In some examples, extra data size (greater than actual data object size) is allocated, as previously described. The data object with the allocated size is shown at 510.

At sequence 522 a determination is made on whether the data object should be compressed. For example, based on data object type, data object size, etc. When the data object is to be compressed, the method can proceed to sequence 524 where the data object is compressed. The method can then process to sequence 528. At sequence 528, a SODS instance can be located or created. For example, the SODS instance can be looked-up in a database or hash table (e.g., created by the parser in sequence 516). When a SODS instance cannot be located, a new SODS instance can be created. In some examples, a SODS instance can include one index and one data file, each data file configured to store millions of data objects. At sequence 530, the data object is inserted into the SODS instance. For example, the refrigerator state data and metadata can be written to the data store. In some examples, the data object is a new data object which is written to data storage (e.g., Storage 116) at sequence 532. In other examples, the data object is an update of a previously store data object (e.g., updated state data). At sequence 534, the previously stored data object is obtained. At sequence 536, a callback can be performed. For example, an insert of a new data object or an update of the previously stored data object with the new data object (e.g., diff, absolute diff, subtraction, a replacement, delta, etc.). At sequence 538, method 500 can end.

The method shown in FIG. 6 is provided by way of example, as there are a variety of ways to carry out the method. Additionally, while the example method is illustrated with a particular order of sequences, those of ordinary skill in the art will appreciate that FIG. 6 and the sequences shown therein can be executed in any order that accomplishes the technical advantages of the present disclosure and can include fewer or more sequences than illustrated.

Each sequence shown in FIG. 6 represents one or more processes, methods or subroutines, carried out in the example method. The sequences shown in FIG. 6 can be implemented in a network environment such as network environment 100 shown in FIG. 1. The flow chart illustrated in FIG. 6 will be described in relation to and make reference to at least the elements of system 100 shown in FIG. 1.

FIG. 6 shows a flow diagram of an example method 600 of SODS data object insert and callback flow. Method 600 can start at sequence 602. At sequence 604 a data object is received at a cloud (e.g., cloud instance 102, storage 116, servers 104, etc.). For example, a cloud can receive state data and metadata from a networked refrigerator. At sequence 606, an insert function can be executed. For example, to insert the refrigerator state data (e.g., data object) in storage (e.g., Storage 116). At sequence 608, a determination is made to whether the data of the data object is NULL. For example, is the refrigerator state data equal to NULL. When the data is NULL, method 600 can proceed to sequence 610. When the data is not NULL, method 600 can proceed to sequence 628.

At sequence 610, a delete function can be executed. For example, begin the process of deleting a currently stored refrigerator state data (e.g., data object). At sequence 612, the index file can be searched by the key of the data object to locate a currently stored version of the data object. For example, refrigerator can have key 'abcd', as shown in FIG. 2. At sequence 614, a determination is made as to whether the currently stored version of the data object was found. For example, did the refrigerator key (e.g., 'abcd') locate the refrigerator state data. When a currently stored version of the data object was found, method 600 can proceed to sequence 616. When a currently stored version of the data object was not found, method 600 can proceed to sequence 636.

At sequence 616, the data of the currently stored version of the data object can be written with a NULL (e.g., deleted). For example, deleting the refrigerator state data. At sequence 618, index nodes can be recursively marked as deleted (e.g., if no down, left or right associated after the deletion). For example, the nodes in the path of the refrigerator key (e.g., level 1 node 'a'; level 2 node 'b'; level 3 node 'c'; level 4 node 'd'). At sequence 620, the data object can be marked deleted if reference count is equal to zero (e.g., when all nodes reference keys have been removed). For example, the memory offsets of index nodes can be tracked and data objects that are marked as deleted. This can be tracked in two in-memory lists. These two lists can be consulted when adding new index nodes and data object (e.g., how data is reused for deleted items). When the SODS index and data file are opened, in the case it exists when first opening it, the in-memory lists will populated to track offsets of the free index nodes and data objects.

At sequence 622, the index nodes and data object can be added to a free/available list (e.g., available for new data objects to be written). For example, the location in Storage 116 where the refrigerator data used to be stored. At sequence 624, a list containing active records for the SODS instance can be decremented (e.g., to account for the removed data object). At sequence 626, method 600 can stop.

At sequence 628, the index file can be searched by the key of the data object to locate a currently stored version of the data object. For example, refrigerator key (e.g., 'abcd') can be used to search the index file to locate the currently stored refrigerator state data. At sequence 630, a determination is made as to whether the currently stored version of the data object was found. When a currently stored version of the data object was found, method 600 can proceed to sequence 634. When a currently stored version of the data object was not found, method 600 can proceed to sequence 632.

At sequence 632, the data object was not found (e.g., the currently stored data object is equal to NULL and the new data object is equal to the stored in the received data object). For example, the refrigerator state data was not found. At sequence 634, the data object was found (e.g., the currently stored data object is equal to the previously received data of the data object and the new data object is equal to the stored in the received data object). For example, the refrigerator state data was found.

At sequence 636 a callback is executed (e.g., insert, update, etc.). When sequence 636 is reached from sequence 632, an insert (e.g., write) call back function can be executed. For example, the received refrigerator state data is written to Storage 116. When sequence 636 is reached from sequence 634, an update (e.g., diff, absolute diff, subtraction, a replacement, delta, etc.) call back function can be executed. For example, the received refrigerator state data is compared to the currently stored refrigerator state data and the result written to Storage 116. In some examples, the data from 634 can be similar and then an update would not be required (e.g., diff, etc.).

At sequence 638, index nodes can be identified (e.g., for key searching). For example, the location, using refrigerator key 'abcd' where the state data can be stored (as shown in FIG. 2). In some examples, previously unused nodes can be used. In some examples, the index nodes can be free/available nodes that can be allocated as new nodes (e.g., when needed). At sequence 640, the data of the data object can be stored by determined an available storage space. For example, free/available data space can be used when a free/available data space (e.g., of Storage 116) is greater than or equal to the length allocated (of the data object) the data can be written to the free/available data space. When a free/available data space (e.g., of Storage 116) is less than to the length allocated (of the data object) new data space can be allocated. At sequence 642, when the data object is a new data object to the SODS instance, a list containing active records for the SODS instance can be incremented (e.g., to account for the added data object). At sequence 644, method 600 can stop.

The disclosure now turns to FIGS. 7 and 8, which illustrate example network devices and computing devices, such as switches, routers, load balancers, client devices, and so forth.

FIG. 7 illustrates an example network device 700 suitable for performing switching, routing, load balancing, and other networking operations. Network device 700 includes a central processing unit (CPU) 704, interfaces 702, and a bus 710 (e.g., a PCI bus). When acting under the control of appropriate software or firmware, the CPU 704 is responsible for executing packet management, error detection, and/or routing functions. The CPU 704 preferably accomplishes all these functions under the control of software including an operating system and any appropriate applications software. CPU 704 may include one or more processors 708, such as a processor from the INTEL X86 family of microprocessors. In some cases, processor 708 can be specially designed hardware for controlling the operations of network device 700. In some cases, a memory 706 (e.g., non-volatile RAM, ROM, etc.) also forms part of CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 604 to efficiently perform routing computations, network diagnostics, security functions, etc.

Although the system shown in FIG. 7 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC), which can be configured to perform routing and/or switching operations. The ASIC can communicate with other components in the network device 700 via the bus 710, to exchange data and signals and coordinate various types of operations by the network device 700, such as routing, switching, and/or data storage operations, for example.

FIG. 8 illustrates a computing system architecture 800 wherein the components of the system are in electrical communication with each other using a connection 805, such as a bus. Exemplary system 800 includes a processing unit (CPU or processor) 810 and a system connection 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware or software service, such as service 1 832, service 2 834, and service 3 836 stored in storage device 830, configured to control the processor 810 as well as a special-purpose processor where software instructions are incorporated into the actual processor design. The processor 810 may be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include services 832, 834, 836 for controlling the processor 810. Other hardware or software modules are contemplated. The storage device 830 can be connected to the system connection 805. In one aspect, a hardware module that performs a particular function can include the software component stored in a computer-readable medium in connection with the necessary hardware components, such as the processor 810, connection 805, output device 835, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

We claim:

1. A method of storing state object data, the method comprising:
 receiving, at storage system, a data object and a request to store the data object, wherein the data object includes state data and metadata of a networked device;
 identifying a data type of the data object;
 identifying a parser based on the identified data type;
 executing the identified parser on the data object to determine information associated with the data object;
 determining a data size allocation for the data object;
 locating a state object data store based at least in part on the information associated with the data object, wherein the state object data store is accessible by the processor; and
 inserting the data object at the state object data store.

2. The method of claim 1, wherein the data type is determined based on signature matching.

3. The method of claim 1, wherein executing the parser identifies a key, action, call back and algorithm associated with the data object.

4. The method of claim 1, further comprising:
 determining an action identified by the parser is a delete action; and
 setting data of the data object to NULL.

5. The method of claim 1, wherein the data size allocation is a size of data of the data object and a multiplier.

6. The method of claim 1, further comprising:
 determining, at the state object data store, a previous version of the data object exists; and
 executing a call back associated with the data object on the previous version of the data object and the received data object; and
 storing, at the state object data store, data resulting from the call back.

7. The method of claim 6, wherein the data resulting from the call back is a difference between the previous version of the data object and the received data object.

8. A system for storing state object data, the system comprising:
 at least one processor; and
 at least one memory storing instructions, which when executed by the processor causes the processor to:
 receive a data object and a request to store the data object, wherein the data object includes state data and metadata of a networked device;
 identify a data type of the data object;
 identify a parser based on the identified data type;
 execute the identified parser on the data object to determine information associated with the data object;
 determine a data size allocation for the data object;
 locate a state object data store based at least in part on the information associated with the data object, wherein the state object data store is accessible by the processor; and
 insert the data object at the state object data store.

9. The system of claim 8, wherein the data type is determined based on signature matching.

10. The system of claim 8, wherein executing the parser identifies a key, action call back and algorithm associated with the data object.

11. The system of claim 8, further comprising instructions which when executed by the processor causes the processor to:
 determine an action identified by the parser is a delete action; and
 set data of the data object to NULL.

12. The system of claim 8, wherein the data size allocation is a size of data of the data object and a multiplier.

13. The system of claim 8, further comprising instructions which when executed by the processor causes the processor to:
 determine, at the state object data store, a previous version of the data object exists; and
 execute a call back associated with the data object on the previous version of the data object and the received data object; and
 store, at the state object data store, data resulting from the call back.

14. The system of claim 13, wherein the data resulting from the call back is a difference between the previous version of the data object and the received data object.

15. A non-transitory computer readable medium storing instructions, which when executed by a processor causes the processor to:
 receive a data object and a request to store the data object, wherein the data object includes state data and metadata of a networked device;
 identify a data type of the data object;
 identify a parser based on the identified data type;
 execute the identified parser on the data object to determine information associated with the data object;
 determine a data size allocation for the data object;
 locate a state object data store based at least in part on the information associated with the data object, wherein the state object data store is accessible by the processor; and
 insert the data object at the state object data store.

16. The non-transitory computer readable medium of claim 15, wherein executing the parser identifies a key, action call back and algorithm associated with the data object.

17. The non-transitory computer readable medium of claim 15, further comprising instructions which when executed by the processor causes the processor to:
 determine an action identified by the parser is a delete action; and
 set data of the data object to NULL.

18. The non-transitory computer readable medium of claim 15, wherein the data size allocation is a size of data of the data object and a multiplier.

19. The non-transitory computer readable medium of claim 15, further comprising instructions which when executed by the processor causes the processor to:
 determine, at the state object data store, a previous version of the data object exists; and
 execute a call back associated with the data object on the previous version of the data object and the received data object; and
 store, at the state object data store, data resulting from the call back.

20. The non-transitory computer readable medium of claim 19, wherein the data resulting from the call back is a difference between the previous version of the data object and the received data object.

* * * * *